US012452316B2

(12) United States Patent
Zhao et al.

(10) Patent No.: US 12,452,316 B2
(45) Date of Patent: Oct. 21, 2025

(54) METHOD AND APPARATUS FOR MEDIA SESSION MANAGEMENT FOR SERVICE ENABLER ARCHITECTURE LAYER (SEAL) ARCHITECTURE

(71) Applicant: Tencent America LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/499,528

(22) Filed: Oct. 12, 2021

(65) Prior Publication Data

US 2022/0329635 A1 Oct. 13, 2022

Related U.S. Application Data

(60) Provisional application No. 63/172,058, filed on Apr. 7, 2021.

(51) Int. Cl.
H04L 65/1069 (2022.01)
H04L 47/72 (2022.01)
H04L 65/1104 (2022.01)

(52) U.S. Cl.
CPC .......... H04L 65/1069 (2013.01); H04L 47/72 (2013.01); H04L 65/1104 (2022.05)

(58) Field of Classification Search
CPC . H04L 65/1069; H04L 65/1104; H04L 47/72; H04L 65/1016; H04L 67/12;
(Continued)

(56) References Cited

U.S. PATENT DOCUMENTS 11,140,581 B2* 10/2021 Oyman ................. H04W 28/22
11,297,111 B2* 4/2022 Buckley .............. H04L 65/1104
(Continued)

FOREIGN PATENT DOCUMENTS

EP 2031828 A2 3/2009
JP 2009081828 A 4/2009
(Continued)

OTHER PUBLICATIONS

3GPP TS 23.434 version 16.6.0 Release Jan. 16, 2021) Service Enabler Architecture Layer for Verticals (SEAL); Functional architecture and inform Identities Section 7.2-.7.4,p. 30, and Section 14.3.2.6, Table 14.3.2.6-1 p. 95, Section 14.3.2.3, Table 14.3.2.3-1 , p. 94, MBMS bearer announcement (Year: 2021).*
(Continued)

Primary Examiner — Greg C Bengzon
(74) Attorney, Agent, or Firm — Sughrue Mion, PLLC

(57) ABSTRACT

Aspects of the disclosure provide a method and a vertical application layer (VAL) server for a media session management in wireless communication. The method includes obtaining session description protocol (SDP) information within a session initiation protocol (SIP) payload associated with a media session and sending a network resource request comprising the SDP information, by a processing circuitry of a media session management module of the VAL server, to a network resource management (NRM) server. The NRM server can be a service enabler architecture layer (SEAL) server. The network resource request can request a network resource. The method further includes receiving, by the VAL server, an evaluation for the network resource request from the NRM server. The media session can be established or terminated based on the received evaluation in the media session management module of the VAL server.

14 Claims, 7 Drawing Sheets

(58) Field of Classification Search
CPC ..... H04L 65/80; H04L 67/51; H04L 41/5054; H04L 45/38; H04L 61/5014; H04L 63/20; H04L 63/205; H04L 67/14; H04L 67/141; H04L 67/147; H04L 69/24; H04L 9/0637; H04L 1/0041; H04L 1/0057; H04L 1/08; H04L 1/1614; H04L 1/1671; H04L 1/1685; H04L 1/1819; H04L 1/1822; H04L 1/1825; H04L 1/1845; H04L 1/1854; H04L 1/188; H04L 12/185; H04L 12/189; H04L 2001/0097; H04L 2101/395; H04L 2101/654; H04L 2209/42; H04L 2209/80; H04L 41/0233; H04L 41/0816; H04L 41/082; H04L 41/0843; H04L 41/0869; H04L 41/0893; H04L 41/16; H04L 41/40; H04L 41/5006; H04L 41/5009; H04L 41/5025; H04L 41/5051; H04L 41/5087; H04L 45/123; H04L 45/308; H04L 47/10; H04L 47/2408; H04L 47/781; H04L 49/70; H04L 5/007; H04L 5/0028; H04L 5/0053; H04L 5/0082; H04L 5/0091; H04L 5/1469; H04L 61/4511; H04L 61/4588; H04L 61/50; H04L 63/0464; H04L 63/10; H04L 63/102; H04L 63/105; H04L 65/1023; H04L 65/1045; H04L 65/1066; H04L 65/1073; H04L 65/1101; H04L 65/4061; H04L 65/65; H04L 67/02; H04L 67/04; H04L 67/10; H04L 67/125; H04L 67/142; H04L 67/143; H04L 67/145; H04L 67/146; H04L 67/148; H04L 67/289; H04L 67/306; H04L 67/34; H04L 67/52; H04L 67/562; H04L 67/59; H04L 67/63; H04L 69/10; H04L 69/32; H04L 69/321; H04L 9/3213; H04L 9/3239; H04L 9/3247; H04L 9/3271; H04L 9/50; H04W 4/40; H04W 12/08; H04W 4/70; H04W 48/18; H04W 60/04; H04W 76/10; H04W 8/24; H04W 4/50; H04W 60/00; H04W 12/06; H04W 28/16; H04W 4/10; H04W 4/44; H04W 48/12; H04W 72/005; H04W 76/14; H04W 80/02; H04W 80/04; H04W 80/10; H04W 84/042; H04W 12/04; H04W 12/068; H04W 12/069; H04W 16/28; H04W 24/08; H04W 24/10; H04W 28/0221; H04W 28/0268; H04W 28/0289; H04W 28/06; H04W 28/18; H04W 28/20; H04W 28/22; H04W 36/0033; H04W 36/0061; H04W 36/0066; H04W 36/00835; H04W 36/03; H04W 36/14; H04W 36/32; H04W 4/00; H04W 4/02; H04W 4/021; H04W 4/029; H04W 4/06; H04W 4/08; H04W 4/18; H04W 4/46; H04W 4/80; H04W 4/90; H04W 40/22; H04W 48/10; H04W 48/14; H04W 48/20; H04W 52/0216; H04W 52/0229; H04W 52/0245; H04W 52/0251; H04W 52/0261; H04W 52/0264; H04W 52/0274; H04W 52/028; H04W 68/005; H04W 72/042; H04W 72/12; H04W 74/02; H04W 74/0816; H04W 74/0833; H04W 76/12; H04W 76/19; H04W 76/27; H04W 76/28; H04W 76/45; H04W 8/005; H04W 8/02; H04W 8/18; H04W 8/20; H04W 8/26; H04W 80/12; H04W 84/06; H04W 88/02; H04W 88/04; H04W 88/06; H04W 88/16; H04W 92/045; H04W 92/18; G06F 2209/45595; G06F 9/45558; G06F 9/5072; G06F 1/206; G06F 11/3006; G06F 16/1805; G06F 16/1824; G06F 2209/5021; G06F 2209/509; G06F 9/4862; G06F 9/4881; G06F 9/505; G06F 9/5061; G06F 9/5094; G06F 9/542; H04M 15/49; H04M 15/50; H04M 15/51; H04M 15/57; H04M 15/63; H04M 15/66; H04M 15/8016; H04M 15/8038

See application file for complete search history.

(56) References Cited

U.S. PATENT DOCUMENTS

| | | | |
|---|---|---|---|
| 2006/0285497 A1* | 12/2006 | Miller | H04L 69/24 370/395.21 |
| 2008/0298237 A1 | 12/2008 | Dos Remedios et al. | |
| 2009/0064218 A1 | 3/2009 | Yamagishi | |
| 2010/0027417 A1* | 2/2010 | Franceschini | H04L 65/80 370/232 |
| 2011/0320619 A1 | 12/2011 | Kolbe et al. | |
| 2014/0372624 A1* | 12/2014 | Wang | H04L 12/189 709/231 |
| 2019/0215729 A1* | 7/2019 | Oyman | H04L 65/1016 |
| 2019/0373511 A1* | 12/2019 | Oyman | H04W 76/27 |
| 2020/0178052 A1* | 6/2020 | Pattan | H04L 41/5051 |
| 2020/0404069 A1* | 12/2020 | Li | H04W 8/24 |
| 2022/0046478 A1* | 2/2022 | Oyman | H04W 28/22 |
| 2022/0053449 A1* | 2/2022 | Shan | H04W 4/40 |
| 2022/0086607 A1* | 3/2022 | Ali | H04W 4/40 |
| 2022/0086741 A1* | 3/2022 | Liao | H04W 4/50 |
| 2022/0086742 A1* | 3/2022 | Arrobo Vidal | H04W 48/16 |
| 2022/0103987 A1* | 3/2022 | Shan | H04W 4/40 |
| 2022/0131908 A1* | 4/2022 | Oyman | H04L 65/1069 |
| 2022/0132455 A1* | 4/2022 | Gupta | H04W 60/00 |
| 2022/0201443 A1* | 6/2022 | El Essaili | H04W 4/44 |
| 2022/0210601 A1* | 6/2022 | El Essaili | H04W 4/44 |
| 2022/0329994 A1* | 10/2022 | El Essaili | H04W 68/005 |

FOREIGN PATENT DOCUMENTS

| | | |
|---|---|---|
| KR | 10-2006-0066600 A | 6/2006 |
| WO | 2011043016 A1 | 4/2011 |

OTHER PUBLICATIONS

International Search Report and Written Opinion issued Jan. 21, 2022 in PCT/US 21/54963, citing references AA-AC therein, 15 pages.
Supplementary European Search Report issued Jun. 29, 2023 in Application No. 21931926.6, pp. 1-11.
"3rd Generation Partnership Project; Technical Specification Group Services and System Aspects; Service Enabler Architecture Layer for Verticals (SEAL); Functional architecture and information flows; (Release 17)", 3GPP Standard; Technical Specification; 3GPP TS 23.434, 3rd Generation Partnership Project (3GPP), Mobile Competence Centre ; 650, Route Des Lucioles ; F-06921 Sophia-Antipolis Cedex; France.
Japanese Office Action issued Jan. 16, 2024 in Application No. 2022-568463, pp. 1-9.
"3rd Generation Partnership Project; Technical Specification Group Services and System Aspects; Service Enabler Architecture Layer for Verticals (SEAL); Functional architecture and information flows; (Release 17)", 3GPP Standard; Technical Specification; 3GPP TS 23.434, V17.0.0, Dec. 2020, pp. 1-127.
M. Handley UCL V. Jacobson Packet Design C. Perkins University of Glasgow, "SDP: Session Description Protocol", Network Working Group, RFC 4566, Jul. 2006, pp. 1-49 (43 pages total).
Communication dated May 17, 2024, issued in European Application No. 21 931 926.6.

(56) References Cited

OTHER PUBLICATIONS

Chinese Office Action dated Mar. 27, 2025 in Application No. 202180031395.X.

* cited by examiner

METHOD AND APPARATUS FOR MEDIA SESSION MANAGEMENT FOR SERVICE ENABLER ARCHITECTURE LAYER (SEAL) ARCHITECTURE

INCORPORATION BY REFERENCE

This present disclosure claims priority to U.S. Provisional Application No. 63/172,058, "Method and apparatus of supporting session description protocol (SDP) parameters for media session management for 3GPP service enabler architecture layer (SEAL) architecture" filed on Apr. 7, 2021, which is incorporated by reference herein in its entirety.

TECHNICAL FIELD

The present disclosure describes embodiments generally related to a service enabler layer for supporting vertical applications operating over a wireless network.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems have been designed to have advanced built-in features to support enterprise segments or vertical industries such as health care, automotive, smart factories, mission-critical communications, and the like. Vertical application standards are being developed to enable rapid deployment of vertical services based on common services provided by wireless networks. A vertical domain can be an industry or a group of enterprises in which similar products or services are produced. A vertical application provides services or functions useful in a specific vertical domain.

SUMMARY

Aspects of the disclosure provide a method and a vertical application layer (VAL) server for media session management in wireless communication. The VAL server can include processing circuitry. In an embodiment, the VAL server can include a media session management module that includes the processing circuitry. Session description protocol (SDP) information within a session initiation protocol (SIP) payload associated with a media session can be obtained. A network resource request comprising the SDP information can be sent by the processing circuitry of the media session management module of the VAL server to a network resource management (NRM) server. The NRM server can be a service enabler architecture layer (SEAL) server. The network resource request can request a network resource. An evaluation for the network resource request can be received by the VAL server from the NRM server. A media session in the media session management module of the VAL server can be established or terminated based on the received evaluation.

The evaluation can include one of (i) a denial of the network resource request or (ii) a grant of the network resource request.

In an example, the network resource request is evaluated by the NRM server to grant the network resource request or deny the network resource request.

In an embodiment, in response to the grant of the network resource request, the requested network resource can be allocated by the NRM server and the media session can be established based on the allocated network resource.

In an embodiment, in response to the denial of the network resource request by the NRM server, the media session can be terminated.

In an embodiment, the network resource requested is at least one of a network bandwidth requirement and a bitrate requirement.

In an embodiment, the media session is an SIP session.

In an example, the evaluation is based on one of a maximum bandwidth allowed for the media session and a maximum bitrate allowed for the media session.

In an example, the network resource request further includes an identity of the VAL server, and an identity of VAL user equipment (UE).

Aspects of the disclosure also provide non-transitory computer-readable mediums storing instructions which when executed by a computer cause the computer to perform the method for media session management in wireless communication.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Embodiments of the disclosure implement a service enabler layer for supporting vertical applications (or verticals). The service enabler layer can be referred to as a service enabler architecture layer (SEAL) in this disclosure. The SEAL can provide a common set of capabilities (or services) used by multiple verticals to accelerate the development and deployment of vertical applications. For example, instead of developing auxiliary services specific to each vertical, commonly used auxiliary services can be captured into the SEAL and shared by multiple vertical applications. Usage of all SEAL services by a vertical application can be optional. A vertical application can decide to use any subset of services from the SEAL.

In some embodiments, a functional model for SEAL can be organized into a generic SEAL service functional model and multiple specific SEAL service functional models. The generic SEAL service functional model can be used as a reference model for the specific SEAL service functional models. The generic functional model can include an on-network functional model and an off-network functional model. In various embodiments, the SEAL services provided to support the vertical application layer can include location management, group management, configuration management, identity management, key management, network resource management, and the like.

Figure 1:
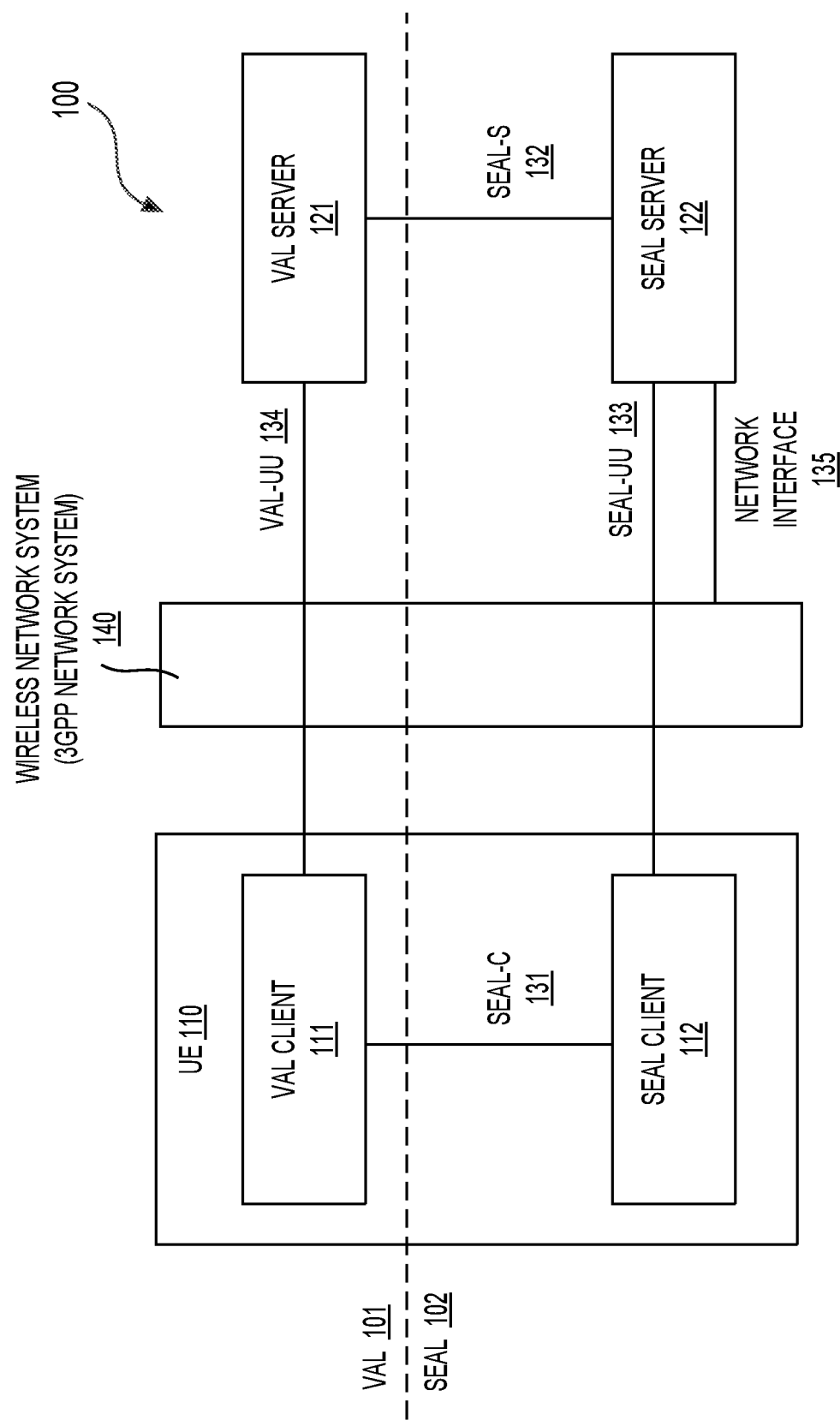
FIG. 1 shows a generic on-network functional model (100) according to an embodiment of the disclosure.

FIG. 1 shows a generic on-network functional model (100) according to an embodiment of the disclosure. The model (100) can include four types of functional entities: a vertical application layer (VAL) client (111), a VAL server (121), a SEAL client (112), and a SEAL server (122). A number of each type of functional entities in the model (100) can be one or more than one. The VAL client and the VAL server entities can belong to a VAL (101). The SEAL client and the SEAL server entities can belong to a SEAL (102). The VAL client (111) and the SEAL client (112) can be included in user equipment (UE) (110). The model (100) further includes a wireless network system (140) (such as a Third Generation Partnership Project (3GPP) network system). The elements can be coupled together as shown in FIG. 1.

In the VAL (101), the VAL client (111) can communicate with the VAL server (121) over a VAL-UU reference point (134) corresponding to a VAL-UU interface. In an example, the VAL-UU interface supports both unicast and multicast delivery modes.

The SEAL (102) can offer various services to the VAL (101). The SEAL client(s) can communicate with the SEAL server(s) over a SEAL-UU reference point(s) (133) corresponding to a SEAL-UU interface. The SEAL-UU interface can support both unicast and multicast delivery modes. The SEAL client(s) can provide the service enabler layer support functions to the VAL client(s) over a SEAL-C reference point (131) (corresponding to a SEAL-C interface). The VAL server(s) can communicate with the SEAL server(s) over a SEAL-S reference point(s) (corresponding to a SEAL-S interface). The SEAL server(s) (122) may communicate with the underlying wireless network system (e.g., the 3GPP network system) (140) using a 3GPP interface (135) specified by the wireless network system (e.g., the 3GPP network system) 140.

For a specific service (such as the location management service), a specific SEAL client and a specific SEAL server along with the specific SEAL-UU reference point and the specific network interface of the wireless network system (e.g., the 3GPP network system) can form or belong to a specific on-network functional model.

In some embodiments, to support distributed SEAL server deployments, a SEAL server may interact with another SEAL server for the same SEAL service over a so-called SEAL-E reference point (not shown in FIG. 1). A SEAL server can interact with another SEAL server for inter-service communication over a so-called SEAL-X reference point (not shown in FIG. 1). A SEAL server may interact with a VAL user database for storing and retrieving a user profile over a VAL-UDB reference point.

In various embodiments, functional entities in a VAL system (for example, including the VAL 101 and the SEAL 102) can provide application control and media-specific functions to support one or more VAL services. In the FIG. 1 example, the VAL client (111) (e.g., a vehicle-to-everything (V2X) client) can provide client-side functionalities corresponding to a vertical application (e.g., an unmanned aerial vehicle (UAV) client, a V2X client). The VAL client (111) can support s interactions of the vertical application with the SEAL client(s) (112). The VAL server (121) (e.g. a UAV server, a V2X server) can provide server-side functionalities corresponding to the vertical application.

In the FIG. 1 example, the SEAL client (112) can provide client-side functionalities corresponding to a specific SEAL service (e.g., location management, network resource management, or the like). The SEAL client (112) can support interactions with the VAL client(s) (111). The SEAL client can also support interactions with a corresponding SEAL client between the two UEs. The SEAL server (122) can provide server-side functionalities corresponding to the specific SEAL service. The SEAL server (122) can support interactions with the VAL server(s) (121). The SEAL server can also support interactions with the corresponding SEAL server in distributed SEAL deployments.

The functional entities in the model (100) can be implemented in various ways in different embodiments. For example, the functional entities can be implemented in a distributed manner or a centralized manner. The functional entities can be implemented as software or a combination of software and hardware.

In the FIG. 1 example, the VAL user database (not shown) can contain information of user profiles associated with a VAL service provided by a VAL service provider. Typically, each VAL service may have a corresponding user database, such as a mission critical push to talk (MCPTT) user database, a mission critical video (MCVideo) user database, and a mission critical data (MCData) user database.

In some embodiments, the interactions related to the VAL (101) support functions between the VAL client (111) and the VAL server (121) are supported by the VAL-UU reference point (134). In an example, the VAL-UU reference point (134) is an instance of a Uu reference point as described in 3GPP TS 23.401 and 3GPP TS 23.501. In some embodiments, the interactions related to VAL support functions between the VAL clients of two UEs can be supported by a VAL-PC5 reference point (not shown). For example, the VAL-PC5 reference point can be an instance of a PC5 reference point as described in 3GPP TS 23.303.

In some embodiments, the interactions between a SEAL client (112) and the corresponding SEAL server (122) are supported by the SEAL-UU reference point (133). The specific SEAL service reference point corresponding to the SEAL-UU (133) can be specified in a specific SEAL service functional model. In some embodiments, the interactions between the SEAL clients of two VAL UEs can be supported by a SEAL-PC5 reference point (not shown). The specific SEAL service reference point corresponding to the SEAL-PC5 can be specified in a specific SEAL service functional model.

In some embodiments, the interactions between the VAL client(s) (111) and the SEAL client(s) (112) within the VAL UE (110) are supported by the SEAL-C reference point (131). The specific SEAL service reference point corresponding to the SEAL-C (131) can be specified in a specific SEAL service functional model.

In some embodiments, the interactions between the VAL server (121) and the SEAL server (132) are supported by the SEAL-S reference point (132). A specific SEAL service reference point corresponding to the SEAL-S (132) can be specified in the specific SEAL service functional model.

In some embodiments, the interactions between the SEAL servers of the same type (e.g., providing a same type of SEAL service) are supported by a SEAL-E reference point (not shown). The specific SEAL service reference point corresponding to the SEAL-E is specified in the specific SEAL service functional model.

In some embodiments, the interactions between the SEAL servers of different types can be supported by a SEAL-X reference point. Examples of specific reference points corresponding to the SEAL-X reference points can include a reference point SEAL-X1 between a key management server and a group management server, a reference point SEAL-X2 between a group management server and a location management server.

A reference point VAL-UDB exists between a VAL user database and a SEAL server. The reference point VAL-USB can be used for storing the user profile data in a specific VAL user database and obtaining the user profile from the specific VAL user database for further configuration in a UE.

In various embodiments, different identities can be configured and used in a VAL system developed based on the model (100). In some embodiments, a VAL user can present a user identity (User ID) to an identity management server in the SEAL (102) during a user authentication transaction to provide an identity management client a means for VAL service authentication. In general, since identity management is a common SEAL service, the identity management server uses a set of credentials (e.g. biometrics, secureID, username/password) that may not necessarily be tied to a single VAL service. The user credentials uniquely identify the VAL user to the identity management server. As an example, the specific security and authentication mechanisms required in order to use the user ID is specified in 3GPP TS 33.434.

In some embodiments, a VAL user ID is a unique identifier within the VAL service that represents the VAL user. For example, the VAL user ID may be a uniform resource identifier (URI). The VAL user ID is used for authentication and authorization purposes for providing the VAL service towards the VAL user via a VAL UE. The VAL user ID also indicates a VAL service provider with which the VAL user has a VAL service agreement. The VAL user may have a VAL service agreement with a VAL service provider and thus have obtained a unique VAL user ID per a VAL service provider. The VAL user ID can be used to access a SEAL service.

In some embodiments, a VAL UE ID is a unique identifier within a VAL service that represents the VAL UE. For example, the VAL UE ID for a V2X service is mapped to a Station ID as specified in ETSI TS 102 894-2. The VAL UE ID is used to address the VAL UE in order to send VAL messages.

In some embodiments, a VAL service ID is a unique identifier that represents a VAL service. A VAL server provides a list of VAL services towards VAL users or VAL UEs. Each VAL service is uniquely identified by a VAL service ID, which is an identifier of the VAL application providing that VAL service. The VAL service ID can be used for policy mapping, QoS handling for VAL communication and VAL message distribution. For example, an identifier of a V2X service, e.g. ITS-AID or PSID specified in ETSI TS 102 965 and ISO TS 17419, can be used as a V2X service ID.

In some embodiments, a VAL group ID is a unique identifier within a VAL service that represents a set of VAL users or VAL UEs according to the VAL service. The set of VAL users may belong to the same or different VAL service providers. The VAL group ID indicates the VAL application server where the group is defined.

In some embodiments, a VAL system ID is a globally unique identifier representing a VAL system. In some embodiments, a VAL Stream ID is an identity used by the VAL server to identify a VAL stream.

In various embodiments, the SEAL architecture as described above can support deployments in which SEAL services are deployed within and/or outside a public land mobile network (PLMN) network. The SEAL architecture can also support centralized as well as distributed deployments of vertical applications. A mobile network operator (MNO) can leverage an appropriate deployment model according to need and that is suitable to its business.

A deployment model can involve multiple entities, such as VAL users, VAL service providers, SEAL providers, and PLMN operators. As an example, in a possible deployment model, SEAL server(s) can be deployed within a PLMN operator domain, and vertical application servers can be deployed in a VAL service provider domain. SEAL servers can also interact with another SEAL server of a same SEAL service, which is deployed in a different PLMN operator domain, using a SEAL-E interface.

There can be possibilities of multiple business relationships among entities involved in a deployment. Based on a service-specific agreement, VAL Users belong to a VAL service provider domain. A VAL service provider and a home PLMN operator may belong to a same organization. The VAL service provider can have a service agreement with a SEAL service provider. It is also possible that the VAL service provider, the SEAL service provider, and the home PLMN operator belong to the same organization. The VAL service provider and the home PLMN operator may have a service agreement if they do not belong to the same organization.

Referring to FIG. 1, the SEAL architecture can provide network resource management. More specifically, the SEAL client (112) is a network resource management (NRM) client (112). The SEAL server (122) is a NRM server (122). The NRM client (112) functional entity can act as the VAL client (111) for the management of network resources. The NRM client (112) can interact with the NRM server (122).

The NRM server (122) functional entity can provide management of the network resources (e.g., unicast, multicast) of the wireless network system (e.g., the 3GPP network system) (140) to support the VAL client (111).

The interactions related to network resource management functions between the NRM client (112) and the NRM server (122) can be supported by the SEAL-UU reference point (133) (also referred to as a NRM-UU reference point). The interactions related to network resource management functions between the VAL server(s) (121) and the NRM server (122) can be supported by the SEAL-S reference point (132) (also referred to as a NRM-S reference point).

In some embodiments, the interactions between the VAL client(s) (111) and the NRM client(s) (112) within the VAL UE (110) are supported by the SEAL-C reference point (131) (also referred to as a NRM-C reference point).

In various real-time media communications, a combination of a session initiation protocol (SIP) and a session description protocol (SDP) can be used for session initialization and media parameter negotiation. Both protocol data can be carried in a control plane before real media traffic goes through a network, such as the wireless network system (140) (e.g., the 3GPP network system). SDP can be carried as an SIP payload that can include media codec related parameters (e.g., all media codec related parameters). SDP can be used to convey information about media streams and provide sufficient information to enable joining and participating in a media session, for example, in a unicast scenario.

In an embodiment, an important piece of information carried in an SDP is a potential bandwidth usage for a particular media stream. In an example, for a payload, such as a UAV media-related payload, knowledge of the bandwidth that the payload (e.g., the UAV media-related payload) intends to use is important for resource allocation in the network, such as the wireless network system (140) (e.g., the 3GPP network system).

The SEAL can support SIP for session establishment. According to an embodiment of the disclosure, SDP data point(s) can be added to address unicast media session monitoring and management.

For media session management, SDP in an SIP package can carry important information about media parameters, as shown below.

v=0
o=Client1 2398026505 2307593197 IN IP4 100.200.130.140
s=Client1 Audio Session
b=AS:64
b=RS:800
b=RR:2400
c=IN IP4 10.11.12.13
t=0 0
m=audio 15010 RTP/AVP 0 101
a=rtpmap:0 PCMU/8000
a=rtpmap:101 telephone-event/8000
a=sendrecv The SDP information shown above is to be sent from the VAL-server (121) to the NRM server (122) over the NRM-S reference point (132).

An included parameter in the SDP is bandwidth information. The bandwidth information can indicate a maximum bandwidth. The maximum bandwidth can limit a successfully establishing a media session.

In an example, B=AS:bitrate can indicate a maximum bitrate that is allowed for the media session. For example, b=as:64 indicating that a maximum bitrate of 64kb/s is allowed for the media session.

Figure 2:
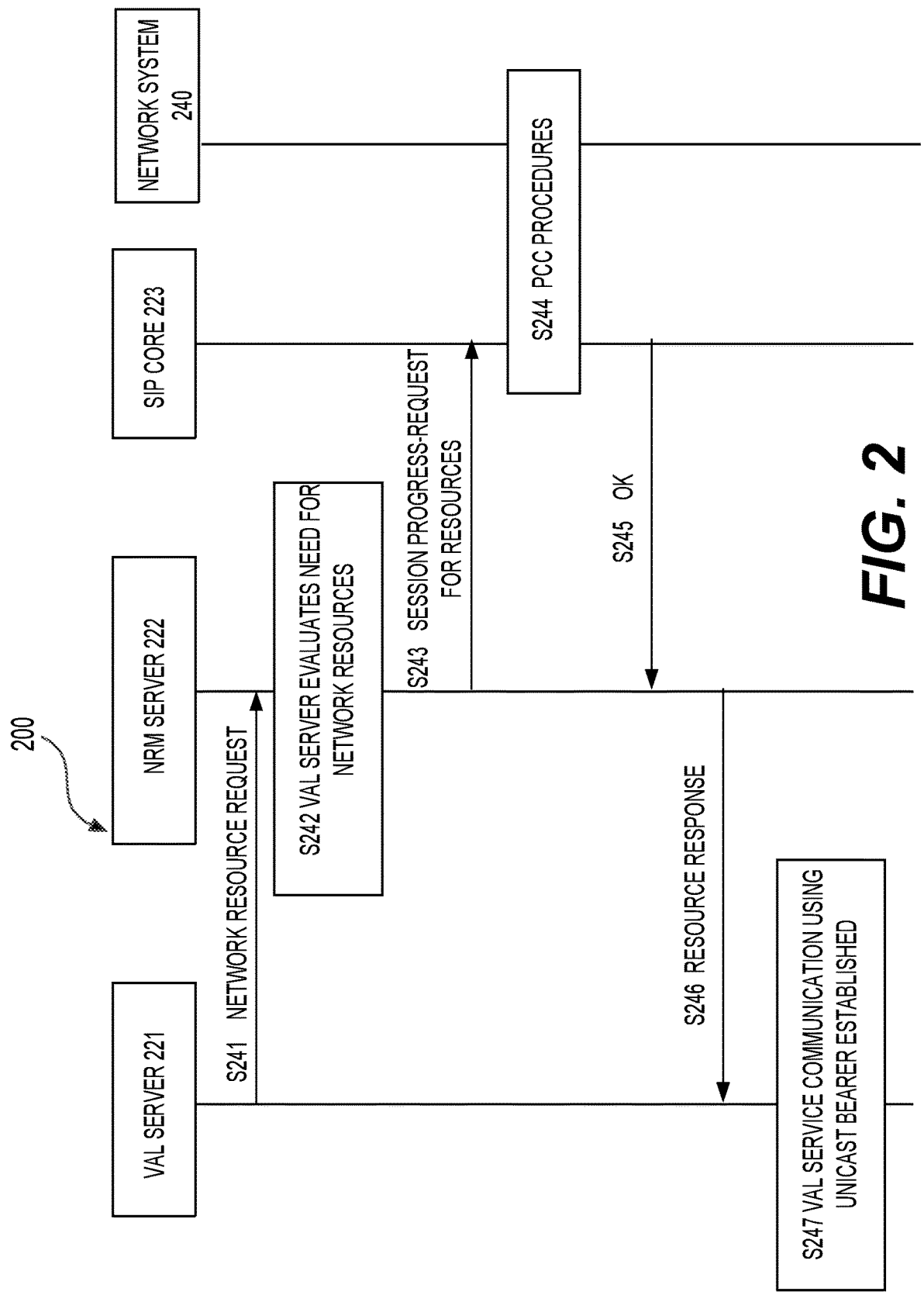
FIG. 2 shows an exemplary workflow (200) for media session management according to an embodiment of the disclosure.

FIG. 2 shows an exemplary workflow (or a procedure) (200) for media session management according to an embodiment of the disclosure. In an example, FIG. 2 shows a resource request at VAL service communication establishment. The workflow (200) can be implemented by a VAL server (221), a NRM server (222), an SIP core (223), and a network system (240). In an embodiment, resource(s) (or network resource(s)) requested in the workflow (200) can include unicast resource(s), and the workflow (200) can be for unicast resource management with the SIP core (223).

The workflow (200) can specify how the network resources are requested at VAL service communication establishment. In an example, if concurrent sessions are used, the NRM server (222) may utilize the capability of resource sharing specified for underlying network policy and charging functions. The request for resources can include an application type, bandwidth, a priority, an application identifier, resource sharing information, and/or the like. In an example, the network resource(s) requested include the bandwidth (e.g., a maximum bandwidth for an application).

The workflow (200) can be suitably adapted and applied to any suitable type of session establishment that uses requests for network resources. In an example, FIG. 2 shows a signaling procedure for requesting resource at session establishment.

In an example, prior to the step (S241), a pre-condition is satisfied where a VAL client has requested VAL service communication with the VAL server (221).

At (S241), the VAL server (221) can send a request (also referred to as a network resource request) for resources to the NRM server (222) to request the network resources, such as the bandwidth for an application. The VAL server (221) can be any suitable server for a vertical application. The VAL server (221) can be an unmanned vehicle (UAV) server for a UAV application, a V2X server for a V2X application, or the like.

At (S242), the NRM server (222) can evaluate the need for the network resources. In an example, the NRM server (222) further evaluates use of resource sharing.

At (S243), the NRM server (222) can send a session progress request containing request for resources to the SIP core (223).

The SIP core (223) can include a number of sub-entities responsible for registration, service selection, and routing in a signaling control plane. In an example, the SIP core (223) is a 3GPP IP multimedia core network subsystem.

Data related to functions of the SIP core (223), such as data for application service selection, the identity of the serving registrar or authentication related information may be provided by the PLMN operator responsible for the bearer plane. Thus, the SIP database that is the source of the data may be part of the Home Subscriber Server (HSS). Alternatively, the data may be provided by a VAL service provider, and the source of the data may be an SIP database of the VAL service provider.

An SIP core local inbound/outbound proxy functional entity can act as both an inbound proxy and an outbound proxy for SIP transactions. The SIP core local inbound/outbound proxy functional entity can provide one or more of the following functions: NAT traversal; resource control; route/forward requests and responses to the user agents; SIP signaling security; and depending on the PLMN operator policy, discovery and address resolution.

At (S244), PCC procedures can be initiated from the SIP core local inbound/outbound proxy (223).

At (S245), the SIP core local inbound/outbound proxy (223) can send an OK message to the NRM server (222).

At (S246), the NRM server (222) can send a resource response to the VAL server (221).

At (S247), the VAL service communication can be established, for example, using a unicast bearer based on the resources that have been allocated.

The VAL server (221) can be similar or identical to the VAL server (121), the NRM server (222) can be similar or identical to the NRM server (122), the network system (240) can be similar or identical to the network system (140), as described with reference to FIG. 1. In an example, the network system (240) is a 3GPP network. Thus, detailed descriptions for the VAL server (221) and the NRM server (222) are omitted for purposes of brevity.

The workflow (200) can be suitably adapted. Step(s) in the workflow (200) can be modified and/or omitted. Additional step(s) can be added. Any suitable order of implementation can be used.

A usage of SDP (e.g., a common usage of SDP) for session negotiation can occur in a unicast scenario, a multicast scenario, and/or the like. In an embodiment, VAL media services use SDP information in the unicast scenario and the multicast scenario. In some examples, SDP used by unicast traffic can be more often than multicast in a network deployment. In some examples, a NRM server does not have options for a VAL server to pass SDP information to the NRM server for unicast traffic. According to an embodiment of the disclosure, SDP information can be added to an information flow from a VAL server to a NRM-S or the NRM server. In some examples, a media session established (or initiated) by a VAL client with SDP is not properly addressed without adding the SDP information in the information flow.

According to an embodiment of the disclosure, a resource request (or a network resource request) can include the SDP information, as described in Table 1 below, in support of unicast SDP/SIP session establishment.

Table 1 describes an information flow for the resource request from a VAL server (e.g., the VAL server (121) or (221)) to a NRM server (e.g., the NRM server (222)) for unicast resources.

TABLE 1

Resource request including the SPD information

| Information element | Status | Description |
| --- | --- | --- |
| Requester Identity | M | The identity of the VAL server performing the request. |
| VAL user ID or VAL UE ID | M | The identity of the VAL user or VAL UE. |
| VAL service requirement information (see NOTE) | O | VAL service requirements for unicast resource (e.g. VAL service ID, Bitrate) |
| SDP information | O | SDP with media and application control information applicable to groups that can use this bearer (e.g. codec, bandwidth, protocol id, forward error correction (FEC) information) |

(NOTE):
When this information element is not included, the NRM server considers default VAL service requirement for the unicast resources.

As shown in Table 1, the resource request can include multiple information elements including a requester identity, a VAL user identifier (ID) or a VAL UE ID, VAL service requirement information, SDP information, and/or the like. The requester identity can describe the identity of a VAL server performing the request (or the resource request). The VAL user ID or the VAL UE ID can describe the identity of the VAL user or the VAL UE. The VAL service requirement information can describe VAL service requirements for unicast resource (e.g. a VAL service ID, a bit rate). The SDP information can describe SDP with media and application control information applicable to groups that can use the bearer (e.g. codec, bandwidth, protocol id, forward error correction (FEC) information). In an example, the requester identity and the VAL user ID are mandatory with a mandatory ("M") status while the VAL service requirement information and the SDP information are optional with an optional ("O") status. When the VAL service requirement information is not included, the NRM server can consider default a VAL service requirement for the unicast resources.

Figure 3:
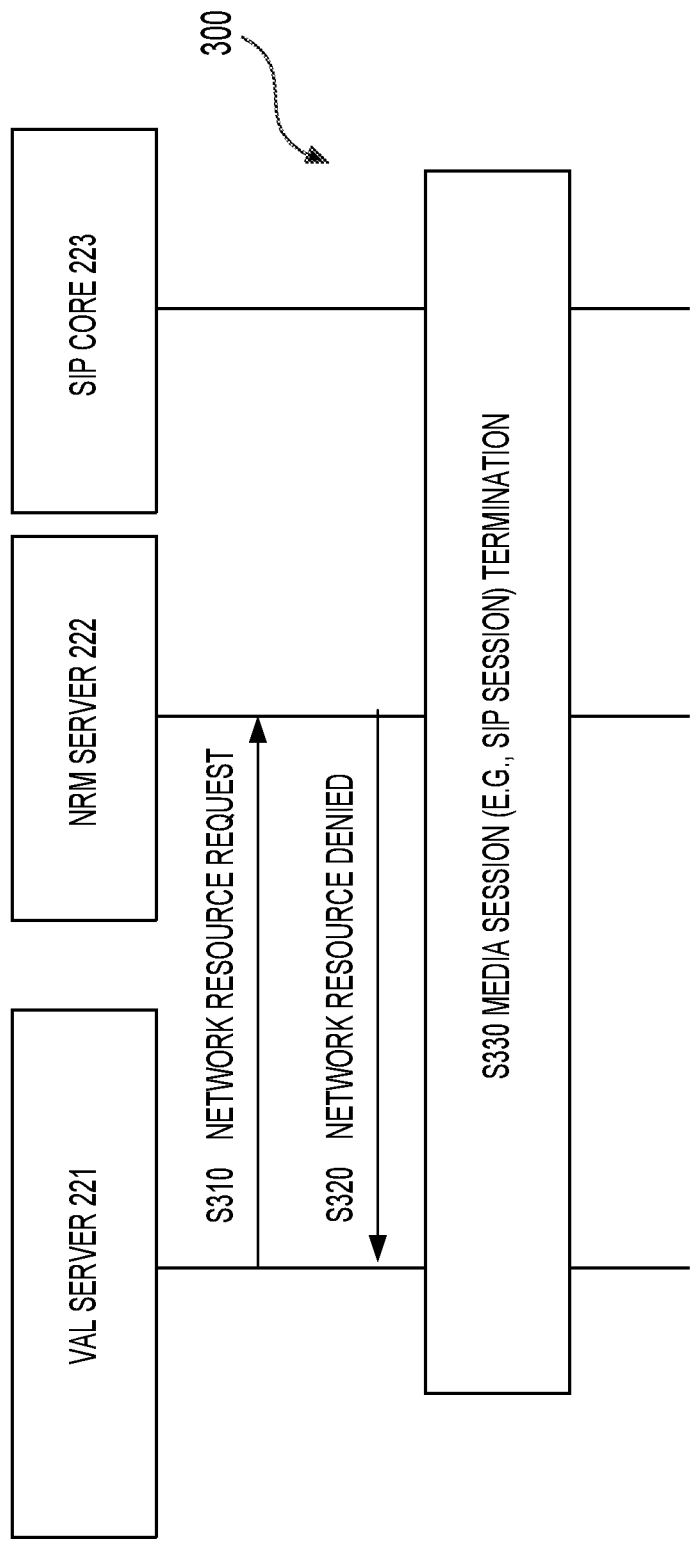
FIG. 3 shows an exemplary workflow (300) for media session management according to an embodiment of the disclosure.

FIG. 3 shows an exemplary workflow (or a procedure) (300) for media session management according to an embodiment of the disclosure. In an example, FIG. 3 shows a resource request at the time of VAL service communication establishment. The workflow (300) can be implemented by the VAL server (221), the NRM server (222), and the SIP core (223). In an embodiment, resource(s) (or network resource(s)) requested in the workflow (300) can include unicast resource(s), and the workflow (300) can be for unicast resource management with the SIP core (223).

The workflow (300) can specify how the network resources are requested at VAL service communication establishment. The request for resources can include an application type, bandwidth, a priority, an application identifier, resource sharing information, and/or the like. In an example, the network resource(s) requested include the bandwidth (e.g., a maximum bandwidth for an application).

The workflow (300) can be suitably adapted and applied to any suitable type of session establishment that uses requests for network resources. In an example, FIG. 3 shows a signaling procedure for requesting resource at session establishment or session initialization.

At (S310), the VAL server (221) (e.g., processing circuitry of the VAL layer (221)) can send a request (also referred to as a network resource request) for resource(s) to the NRM server (222) to request the network resource(s), such as bandwidth for an application (e.g., a UAV application, a V2X application). The VAL server (221) can be any suitable server for a vertical application. The VAL server (221) can be a UAV server for a UAV application, a V2X server for a V2X application, or the like. In an example, the request can include SDP information (e.g., a network bandwidth requirement or bandwidth), as described in Table 1.

After receiving the network resource request, the NRM server (222) can evaluate a need for the network resources, as described in (S242).

At (S320), the network resource request can be denied by the NRM server (222). The denial to the network resource request can be sent from the NRM server (222) to the VAL server (221).

At (S330), in response to the denial of the network resource request, the media session (e.g., an SIP media session or SIP session) can be terminated.

The workflow (300) shows an example how the VAL server (221) (e.g., a UAE server) requests the NRM server (222) to fulfill a session establishment request. In an example, prior to the step (S310), a pre-condition is satisfied where a VAL client has requested VAL service communication with the VAL server (221). For example, for a UAV application, a UAV tries to establish a media session (e.g., an SIP session) between UAV media payload with UAV-C or USS/UTM using the 3GPP core network via the UAV server with the indication of resource requirements for the media session using SIP and SDP.

The workflow (300) can be suitably adapted. Step(s) in the workflow (300) can be modified and/or omitted. Additional step(s) can be added. Any suitable order of implementation can be used.

Figure 4:
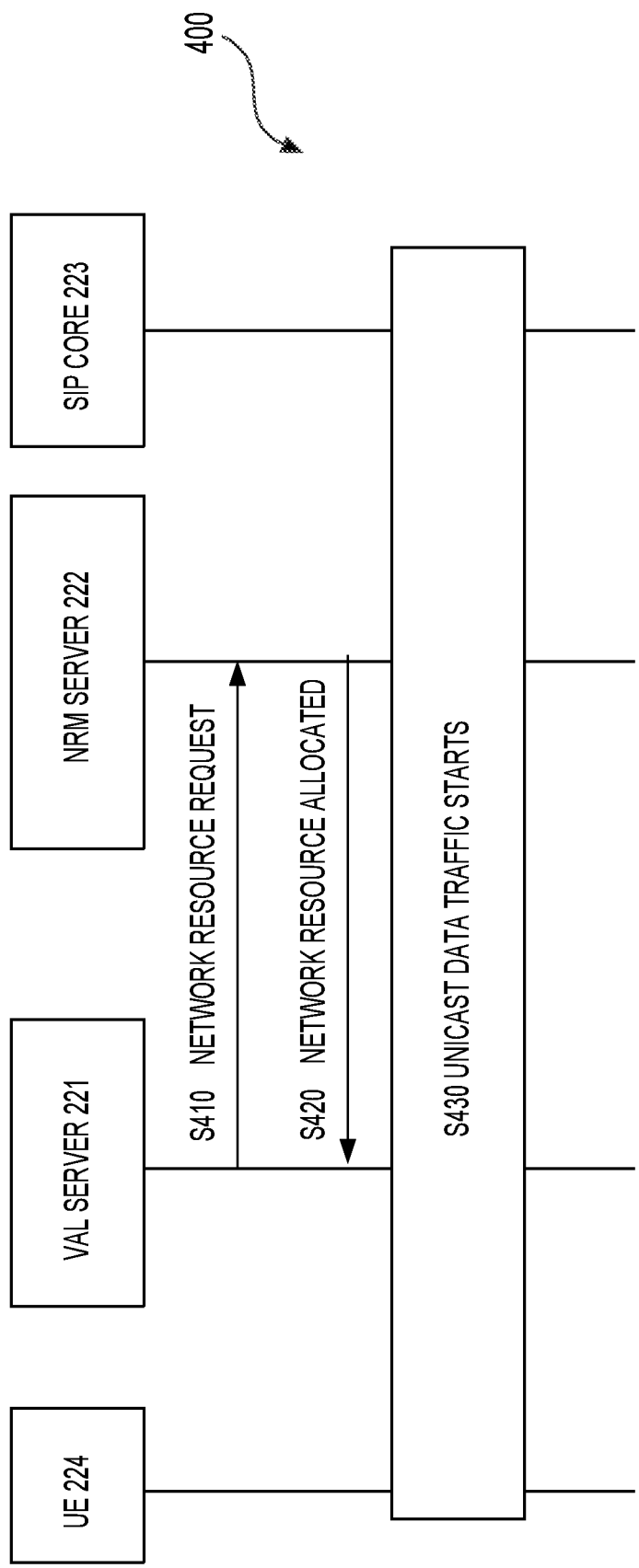
FIG. 4 shows an exemplary workflow (400) for media session management according to an embodiment of the disclosure.

FIG. 4 shows an exemplary workflow (or a procedure) (400) for media session management according to an embodiment of the disclosure. In an example, FIG. 4 shows a resource request at the time of VAL service communication establishment. The workflow (400) can be implemented by the VAL server (221), the NRM server (222), and the SIP core (223). In an embodiment, resource(s) (or network resource(s)) requested in the workflow (400) can include unicast resource(s), and the workflow (400) can be for unicast resource management with the SIP core (223).

The workflow (400) can specify how the network resources are requested at the time of VAL service communication establishment. The request for resources can include an application type, bandwidth, a priority, an application identifier, resource sharing information, and/or the like. In an example, the network resource(s) requested include the bandwidth (e.g., a maximum bandwidth for an application).

The workflow (400) can be suitably adapted and applied to any suitable type of session establishment that uses requests for network resources. In an example, FIG. 4 shows a signaling procedure for requesting resource at session establishment or session initialization.

At (S410), the VAL server (221) (e.g., processing circuitry of the VAL layer (221)) can send a request (also referred to as a network resource request) for resource(s) to the NRM server (222) to request the network resource(s), such as bandwidth for an application (e.g., a UAV application, a V2X application). The VAL server (221) can be any suitable server for a vertical application. The VAL server (221) can be a UAV server for a UAV application, a V2X server for a V2X application, or the like. In an example, the request can include SDP information (e.g., a network bandwidth requirement or bandwidth), as described in Table 1.

After receiving the network resource request, the NRM server (222) can evaluate a need for the network resources, as described in (S242).

At (S420), the network resource request can be granted by the NRM server (222). The grant to the network resource request can be sent from the NRM server (222) to the VAL server (221). The network resource(s) requested can be allocated.

At (S430), in response to the grant of the network resource request, the media session (e.g., an SIP media session or SIP session) can be established and unicast data traffic can start, for example, between UE (224) and the SIP core (223).

The workflow (400) shows an example how the VAL server (221) (e.g., a UAE server) requests the NRM server (222) to fulfill a session establishment request. In an example, prior to the step (S410), a pre-condition is satisfied where a VAL client has requested VAL service communication with the VAL server (221). For example, for a UAV application, a UAV tries to establish a media session (e.g., an SIP session) between UAV media payload with UAV-C or USS/UTM using the 3GPP core network via the UAV server with the indication of resource requirements for the media session using SIP and SDP.

The workflow (400) can be suitably adapted. Step(s) in the workflow (400) can be modified and/or omitted. Additional step(s) can be added. Any suitable order of implementation can be used.

The workflows (300) and (400) described with reference to FIGS. 3-4 can be adapted or combined in any suitable order or any suitable method. For examples, step(s) in the workflow (300) can be adapted and/or step(s) in the workflow (400) can be adapted. The following can be combined: (i) the adapted or the original one or more steps from the workflow (300) and (ii) the adapted or the original one or more steps from the workflow (400). An example of such combination is shown in FIG. 5.

Figure 5:
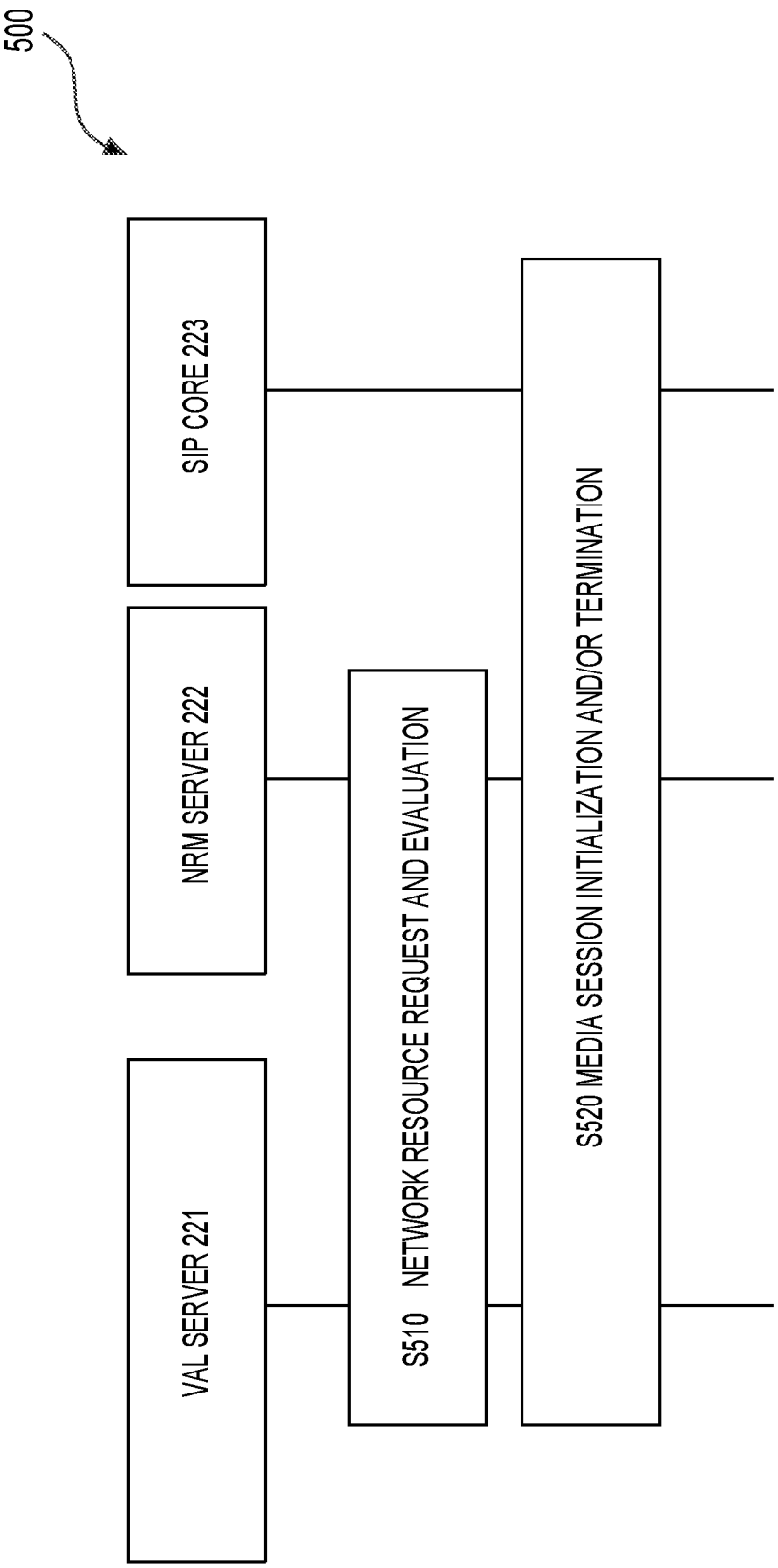
FIG. 5 shows an exemplary workflow (500) for media session management according to an embodiment of the disclosure.

FIG. 5 shows an exemplary workflow (or a procedure) (500) for media session management according to an embodiment of the disclosure. In an example, FIG. 5 is used for requesting resources at the time of VAL service communication establishment. The workflow (500) can be implemented by the VAL server (221), the NRM server (222), and the SIP core (223). In an embodiment, resource(s) (or network resource(s)) requested in the workflow (500) can include unicast resource(s), and the workflow (500) can be for unicast resource management with the SIP core (223).

The workflow (500) can specify how the network resources are requested at VAL service communication establishment. The request for resources can include an application type, bandwidth, a priority, an application identifier, resource sharing information, and/or the like. In an example, the network resource(s) requested include the bandwidth (e.g., a maximum bandwidth for an application).

The workflow (500) can be suitably adapted and applied to any suitable type of session establishment that uses requests for network resources. In an example, FIG. 5 shows a signaling procedure for requesting resources at session establishment or session initialization.

At (S510), the VAL server (221) (e.g., processing circuitry of the VAL layer (221)) can send a request (also referred to as a network resource request) for network resource(s) to the NRM server (222) to request the network resource(s), such as bandwidth for an application (e.g., a UAV application, a V2X application). The network resource(s) can also be referred to as session resource(s).

The VAL server (221) can be any suitable server for a vertical application. The VAL server (221) can be a UAV server for a UAV application, a V2X server for a V2X application, or the like. In an example, the VAL server (221) (e.g., a UAV server) requests media session initialization using SDP in an SIP payload. The network resource request can be referred to as an SIP session request.

At (S510), after receiving the network resource request, the NRM server (222) can evaluate the network resource request, such as a need for the network resources, similar as described in (S242). The evaluation can include a determination whether to grant or deny the network resource request. In an embodiment, the network resource request is determined to be denied, such as shown in FIG. 3. In an embodiment, the network resource request is determined to be granted, such as shown in FIG. 4. In an example, the NRM server (222) evaluates the network resource request as specified in clause 14.3.3.2 of 3GPP TS 23.434. In an example, the request can include SDP information (e.g., a network bandwidth requirement or bandwidth), as described in Table 1.

At (S520), the media session can be initialized and/or terminated based on a result of the evaluation at (S510).

The NRM server (222) can choose to deny the SIP session request due to a lack of available network resources. If the network resource request is determined to be denied at (S510), a message can be sent, for example, from the NRM server (222) to the VAL server (221) indicating the denial of the network resource request. Thus, the media session (e.g., an SIP media session or SIP session) is terminated, as described with reference to FIG. 3.

The NRM server (222) can determine that the network resource(s) can be granted from the SIP core, for example, by using clause 14.3.3.2 of 3GPP TS 23.434. If the network resource request is determined to be granted at (S510), a message can be sent, for example, from the NRM server (222) to the VAL server (221) indicating the grant of the network resource request. The requested network resource(s) can be allocated. Thus, the media session (e.g., an SIP media session or SIP session) can be established or initialized, similar to that described with reference to FIG. 4.

The workflow (500) shows an example how the VAL server (221) (e.g., a UAE server) requests the NRM server (222) to fulfill a session establishment request. In an example, prior to the step (S510), a pre-condition is satisfied where a VAL client has requested VAL service communication with the VAL server (221). For example, for a UAV application, a UAV tries to establish a media session (e.g., an SIP session) between UAV media payload with UAV-C or USS/UTM using the 3GPP core network via the UAV server with the indication of resource requirements for the media session using SIP and SDP.

As shown in FIG. 5, a media session (e.g., an SIP session) may be terminated immediately if a NRM server (e.g., the NRM server (222)) determines that there are not enough network resource(s) (e.g., network bandwidth) for a particular SDP description. Otherwise, the media session (e.g., the SIP session) may be established if the NRM server (e.g., the NRM server (222)) determines that there are enough network resource(s) (e.g., the network bandwidth) for the particular SDP description and the requested network resource(s) (e.g., the network bandwidth) are allocated.

The workflow (500) can be suitably adapted. Step(s) in the workflow (500) can be modified and/or omitted. Additional step(s) can be added. Any suitable order of implementation can be used.

Figure 6:
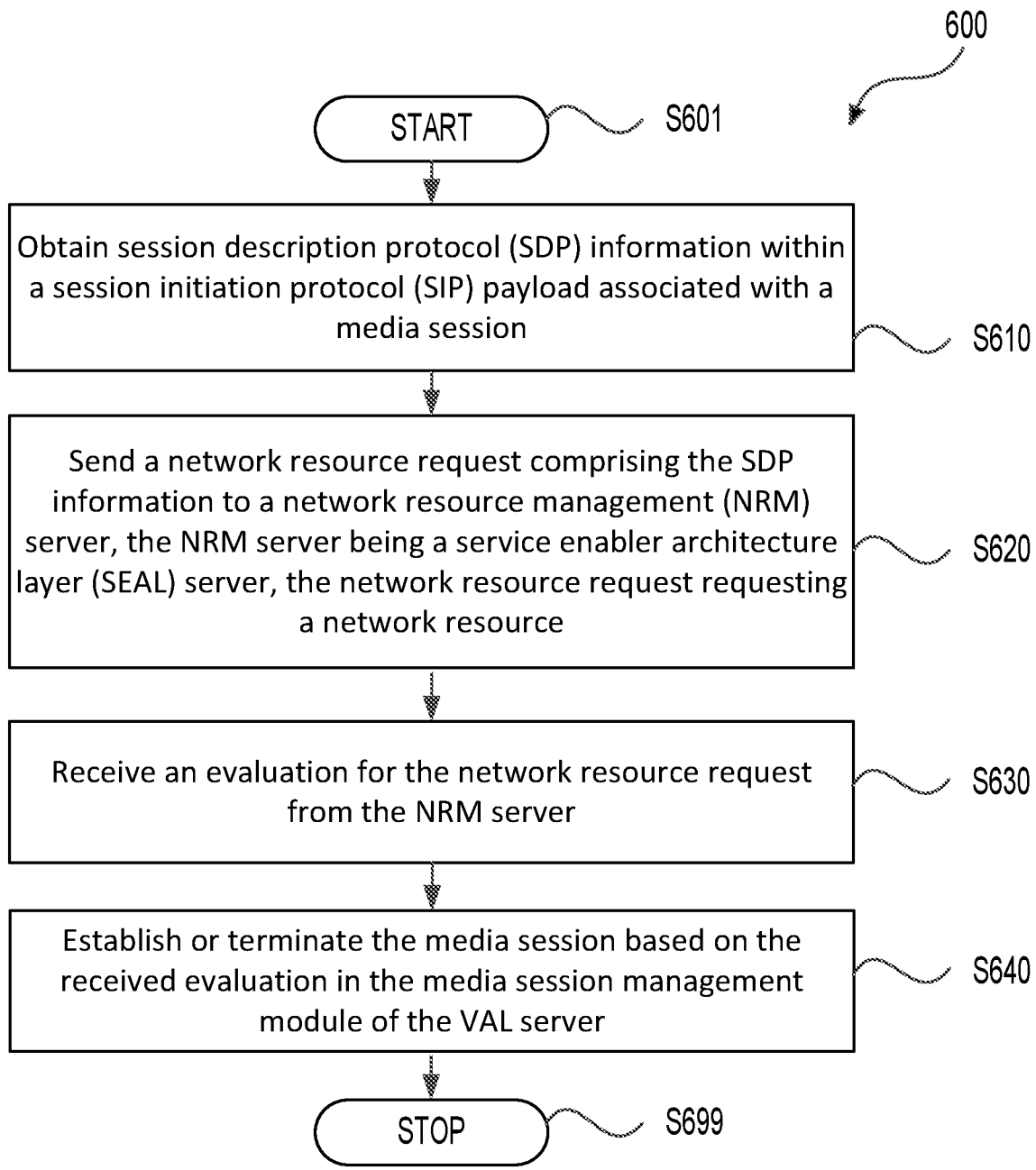
FIG. 6 shows a flow chart illustrating a process (600) according to some embodiments of the disclosure.

FIG. 6 shows a flow chart illustrating a process (600) according to some embodiments of the disclosure. The process (600) can be performed by processing circuitry of a VAL server (e.g., the VAL server (121), the VAL server (221)). In an embodiment, the process (600) is performed by the processing circuitry of a media session management module of the VAL server (e.g., the VAL server (121), the VAL server (221)). The process (600) can be performed for media session management, such as initialization or establishment of a media session, in wireless communication. In an example, the media session is an SIP session. The process (600) can start from (S601) and proceed to (S610).

At (S610), session description protocol (SDP) information within a session initiation protocol (SIP) payload associated with a media session can be obtained.

At (S620), a network resource request comprising the SDP information can be sent, for example, by the processing circuitry of the media session management module of the VAL server (e.g., the VAL server (121), the VAL server (221)), to a NRM server (e.g., the NRM server (222)). The NRM server can be a SEAL server (e.g., SEAL server (122)). The network resource request can request network resource(s). In an embodiment, the network resource(s) requested include unicast resource(s), and the process (600) can be for unicast resource management. The network resource(s) requested can include an application type, a bandwidth requirement, a bitrate requirement, a priority, an application identifier, resource sharing information, and/or the like. In an example, the network resource(s) requested include a network bandwidth requirement. In an example, the network resource(s) requested include a bitrate requirement. In an example, the network resource(s) requested is at least one of the network bandwidth requirement and the bitrate requirement. The network bandwidth requirement can indicate a bandwidth (e.g., a maximum bandwidth for an application).

In an embodiment, the network resource request can be sent using SDP in an SIP payload. In an example, the network resource request includes SDP information (e.g., a network bandwidth requirement), as described in Table 1.

In an example, the network resource request includes an identity of the VAL server, an identity of VAL user equipment (UE), and the SDP information.

At (S630), an evaluation for the network resource request can be received, for example, by the processing circuitry of the VAL server, from the NRM server. The evaluation can include one of (i) a denial of the network resource request or (ii) a grant of the network resource request.

In an embodiment, the network resource request is evaluated by the NRM server to grant the network resource request or deny the network resource request. After receiving the network resource request, the NRM server can evaluate the network resource request, such as a need for the network resources, similar as described in (S242). The evaluation can include a determination whether to grant or deny the network resource request. In an embodiment, the network resource request is determined to be denied, such as shown in FIG. 3. In an embodiment, the network resource request is determined to be granted, such as shown in FIG. 4. In an example, the NRM server evaluates the network resource request as specified in clause 14.3.3.2 of 3GPP TS 23.434.

The network resource request can be denied or granted, for example, by the NRM server, based on availability of the network resource(s). A media session (e.g., an SIP session) can be determined to be denied or granted based on the availability of the network resource(s).

In an embodiment, the evaluation is based on one of a maximum bandwidth allowed for the media session and a maximum bitrate allowed for the media session.

At (S640), the media session can be established or terminated based on the received evaluation in the media session management module of the VAL server.

In an embodiment, in response to the grant of the network resource request, the requested network resource can be allocated, for example, by the NRM server. The media session can be established based on the allocated network resource.

In an embodiment, in response to the denial of the network resource request, the media session can be terminated.

The process (600) can proceed to (S699) and terminate.

The process (600) can be suitably adapted. Step(s) in the process (600) can be modified and/or omitted. Additional step(s) can be added. Any suitable order of implementation can be used.

Embodiments in the disclosure may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium.

For example, including SDP information in a resource request can be combined with any of the embodiments described with reference to FIGS. 2-6. Embodiments described in Table 1 can be used in any suitable media session management procedure(s), for session establishment (or session initialization), session modification, and/or the like.

The techniques described above can be implemented as computer software using computer-readable instructions and physically stored in one or more computer-readable media. The computer software can be coded using any suitable machine code or computer language that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
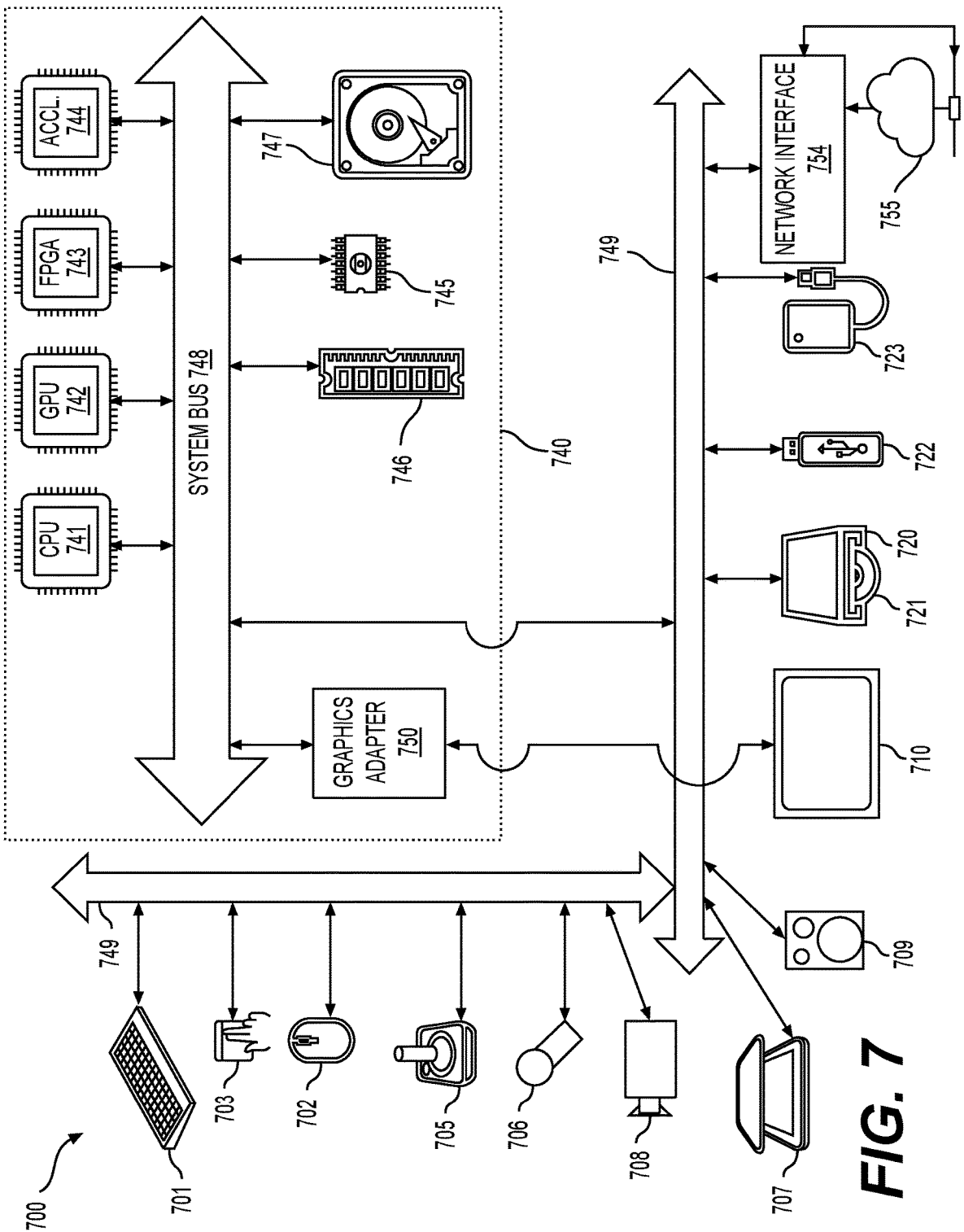
FIG. 7 is a schematic illustration of a computer system in accordance with an embodiment.

FIG. 7 shows a computer system (700) suitable for implementing certain embodiments of the disclosed subject matter. The components shown in FIG. 9 for the computer system (700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid-state drive (723), legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example, USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

The aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (~~50), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieval to any of the memory devices can be enabled through the use of cache memory, that can be closely associated with one or more CPU (741), GPU (742), mass storage (747), ROM (745), RAM (746), and the like.

The computer-readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various embodiments of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of a media session management in wireless communication, comprising:
   in response to a pre-condition being satisfied, obtaining, by a vertical application layer (VAL) server, session description protocol (SDP) information within a session initiation protocol (SIP) payload associated with a unicast media session, the pre-condition being that a VAL client has requested VAL service communication with the VAL server,
      wherein the unicast media session is established between the VAL client that is running on a user equipment (UE) and a SIP core of a 3GPP network, the SDP information comprising bandwidth usage information for the unicast media session;
   sending, by the VAL server, a network resource request to a network resource management (NRM) server for establishing the unicast media session over an NRM-S reference point,
      wherein the NRM server is a service enabler architecture layer (SEAL) server that provides network resource management services to a plurality of vertical applications comprising a first vertical application,
      wherein the network resource request comprises (i) a requester identity element indicating an identity of the VAL server, (ii) a VAL UE ID element indicating an identity of the UE corresponding to the VAL client, (iii) a VAL service requirement information element indicating a VAL service ID for unicast service, (iv) the SDP information comprising the bandwidth usage information for the unicast media session, and (v) a priority of the unicast service requested,
      wherein the bandwidth usage information in the network resource request indicates a maximum bitrate allowed for the unicast media session, and
      when the network resource request does not comprise the VAL service requirement information element, a default VAL service requirement information element is considered for the unicast media session;
   receiving, by the VAL server, grant or denial of the network resource request from the NRM server based on a response to a session progress-request from the SIP core to the NRM server,
      wherein the network resource request is determined to be improper when the network resource request does not include the SDP information comprising the maximum bitrate allowed for the unicast media session, and
      wherein the grant of the network resource request is based on the network resource request being less than a maximum bandwidth allowed for the unicast media session and the maximum bitrate allowed for the unicast media session; and
   establishing the unicast media session between the VAL client and the SIP core based on the grant or the denial received by the VAL server from the NRM server.

2. The method of claim 1, wherein
the network resource request is evaluated by the NRM server to grant the network resource request or deny the network resource request.

3. The method of claim 1, further comprising:
in response to the grant of the network resource request, allocating, by the NRM server using a 3GPP interface connecting the NRM server to the 3GPP network system, network resources based on the network resource requested by the network resource request; and
establishing the unicast media session over the 3GPP network system based on the network resources.

4. The method of claim 1, wherein:
terminating the unicast media session is performed in response to the denial of the network resource request by the NRM server.

5. The method of claim 1, wherein the unicast media session is an SIP session.

6. The method of claim 1, wherein the SDP information included in the network resource request indicates at least one of a codec, protocol ID, or forward error correction (FEC) information applicable to the unicast media session.

7. The method of claim 1, wherein the VAL service requirement information element of the network resource request includes bitrate requirement information for the unicast service.

8. A vertical application layer (VAL) server for a media session management in wireless communication, comprising:
   processing circuitry configured to:
   obtain, in response to a pre-condition being satisfied by a vertical application layer (VAL) server, session description protocol (SDP) information within a session initiation protocol (SEP) payload associated with a unicast media session, the pre-condition being that a VAL client has requested VAL service communication with the VAL server,
      wherein the unicast media session is established between the VAL client running on a user equipment (UE) and a SIP core of a 3GPP network, the SDP information comprising bandwidth usage information for the unicast media session;
   send a network resource request to a network resource management (NRM) server for establishing the unicast media session over an NRM-S reference point, the NRM server, the NRM server being a service enabler architecture layer (SEAL) server that provides network resource management services to a plurality of vertical comprising including a first vertical application, and the network resource request comprising (i) a requester identity element indicating an identity of the VAL server, (ii) a VAL UE ID element indicating an identity of the UE corresponding to the VAL client, (iii) a VAL service requirement information element indicating a VAL service ID for unicast service, (iv) the SDP information associated comprising the bandwidth usage information for the unicast media session, and (v) a priority of the unicast service requested, wherein the bandwidth usage information in the network resource request indicates a maximum bitrate allowed for the unicast media session, and when the network resource request does not comprise the VAL service requirement information element, a default VAL service requirement element is considered for the unicast media session;

receive a grant or a denial of the network resource request from the NRM server based on a response to a session progress-request from the SIP core to the NRM server,
   wherein the network resource request is determined to be improper when the network resource request does not include the SDP information comprising the maximum bitrate allowed for the unicast media session, and
   wherein the grant of the network resource re tis based on the network resource request being less than a maximum bandwidth allowed for the unicast media session and the maximum bitrate allowed for the unicast media session; and establish the unicast media session between the VAL client and the SIP core based on the grant or the denial received by the VAL server from the NRM server.

9. The VAL server of claim 8, wherein
the network resource request is evaluated by the NRM server to grant the network resource request or deny the network resource request.

10. The VAL server of claim 8, wherein the processing circuitry is configured to:
in response to the grant of the network resource request,
allocate, by the NRM server using a 3GPP interface connecting the NRM server to the 3GPP network system, network resources based on the network resource requested by the network resource request; and
establish the unicast media session over the 3GPP network system based on the network resources.

11. The VAL server of claim 8, wherein terminating the unicast media session is performed in response to the denial of the network
resource request by the NRM server.

12. The VAL server of claim 8, wherein the unicast media session is an SIP session.

13. A non-transitory computer-readable medium storing instructions that, when executed by a processor of a vertical application layer (VAL) server, cause the processor to perform a method of a media session management in wireless communication, the method comprises:
in response to a pre-condition being satisfied, obtaining, by a vertical application layer (VAL) server, session description protocol (SDP) information within a session initiation protocol (SIP) payload associated with a unicast media session, the pre-condition being that a VAL client has requested VAL service communication with the VAL server,
   wherein the unicast media session is established between the VAL client running on a user equipment (UE) and a SIP core of a 3GPP network, the SDP information comprising bandwidth usage information for the unicast media session;

sending, by the VAL server, a network resource request to a network resource management (NRM) server for establishing the unicast media session over an NRM-S reference point,
   wherein the NRM server is a service enabler architecture layer (SEAL) server that provides network resource management services to a plurality of vertical applications comprising a first vertical application,
   wherein the network resource request comprises (i) a requester identity element indicating an identity of the VAL server, (ii) a VAL UE ID element indicating an identity of the UE corresponding to the VAL client, (iii) a VAL service requirement information element indicating a VAL service ID for unicast service, (iv) the SDP information comprising the bandwidth usage information for the unicast media session, and (v) a priority of the unicast service requested,
   wherein the bandwidth usage information in the network resource request indicates a maximum bitrate allowed for the unicast media session, and
   when the network resource request does not comprise the VAL service requirement information element, a default VAL service requirement element is considered for the unicast media session;

receiving, by the VAL server, grant or denial of the network resource request from the NRM server based on a response to a session progress-request from the SIP core to the NRM server, wherein the network resource request is determined to be improper when the network resource request does not include the SDP information comprising the maximum bitrate allowed for the unicast media session, and wherein the grant of the network resource request is based on the network resource request being less than a maximum bandwidth allowed for the unicast media session and the maximum bitrate allowed for the unicast media session; and establishing the unicast media session between the VAL client and the SIP core based on the grant or the denial received by the VAL server from the NRM server.

14. The non-transitory computer-readable medium of claim 13, wherein
the network resource request is evaluated by the NRM server to grant the network resource request or deny the network resource request; and
the method further comprises:
in response to the grant of the network resource request,
allocating, by the NRM server using a 3GPP interface connecting the NRM server to the 3GPP network system, network resources based on the network resource requested by the network resource request; and
establishing the unicast media session over the 3GPP network system based on the network resource; and
in response to the denial of the network resource request by the NRM server, terminating the unicast media session.

* * * * *